United States Patent [19]
Bustamante

[11] 3,915,432
[45] Oct. 28, 1975

[54] TRIPLE ACTION MECHANICAL CHUTE-HOIST

[76] Inventor: Carlos Roberto Bustamante, 5303 Alta Vista Road, Bethesda, Md. 20014

[22] Filed: Nov. 13, 1973

[21] Appl. No.: 415,445

[52] U.S. Cl. ............................... 254/157; 254/154
[51] Int. Cl.² ....................................... B66D 5/04
[58] Field of Search ........... 254/151, 169, 167, 154, 254/156, 157, 150; 182/142

[56] References Cited
UNITED STATES PATENTS

| | | | |
|---|---|---|---|
| 2,848,571 | 8/1958 | Carroll | 254/167 |
| 3,112,816 | 12/1963 | Halford | 254/156 |
| 3,150,744 | 9/1964 | Fertier | 254/157 |
| 3,306,582 | 2/1967 | Copeland | 254/154 |
| 3,602,483 | 8/1971 | Russell et al. | 254/154 |

FOREIGN PATENTS OR APPLICATIONS

| | | | |
|---|---|---|---|
| 999,552 | 7/1965 | United Kingdom | 254/154 |
| 612,084 | 11/1948 | United Kingdom | 254/157 |

Primary Examiner—Frank E. Werner
Assistant Examiner—Kenneth Noland
Attorney, Agent, or Firm—Cushman, Darby & Cushman

[57] ABSTRACT

An apparatus for ascending or descending a cable, for example, from a helicopter with a reel member mounted for rotation, to wind or pay out cable, in a frame worn by the human ascending or descending or controlled by a human, for example, to safely drop a load, a centrifugal brake engaging to reel member to provide controlled descent, a manually operable brake to stop descent as desired and a manually or motor operated gear mechanism engaging teeth on the circumference of the reel member to wind cable and ascend.

7 Claims, 6 Drawing Figures

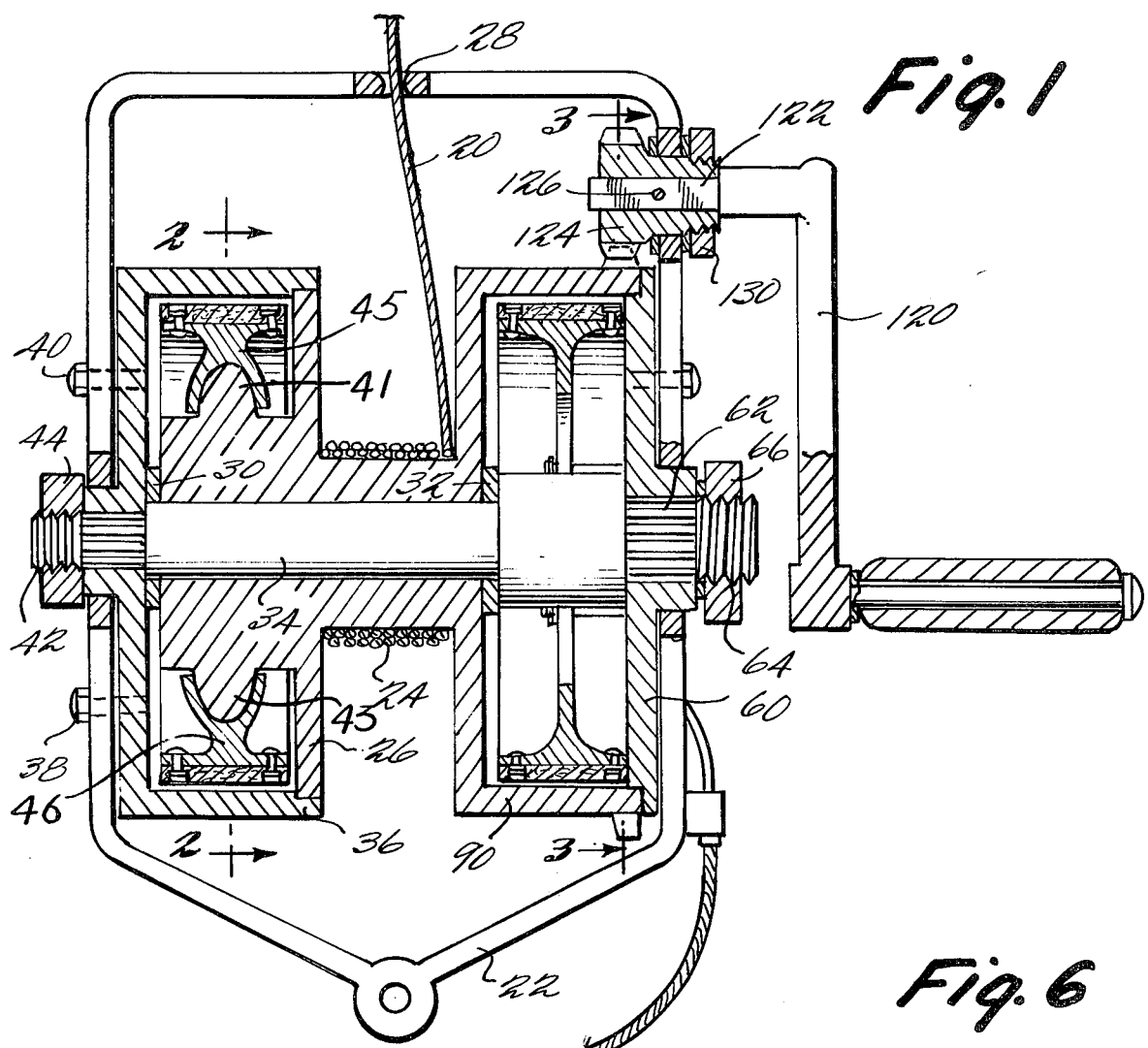
Fig. 1
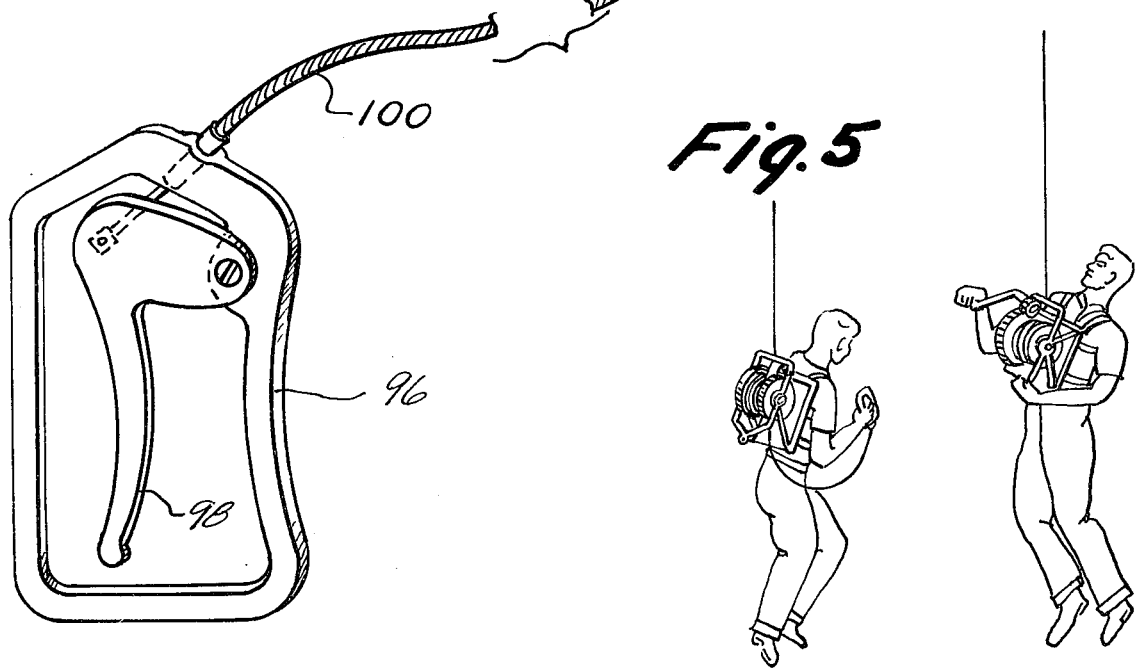
Fig. 6
Fig. 5

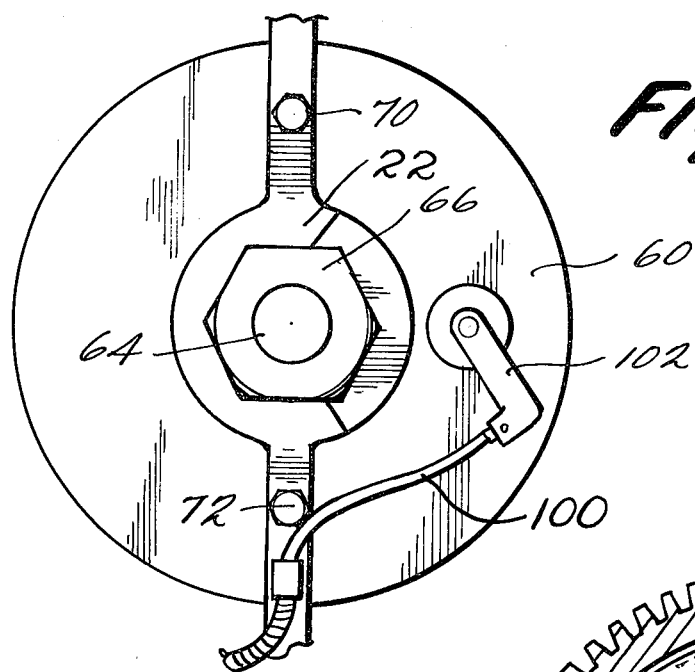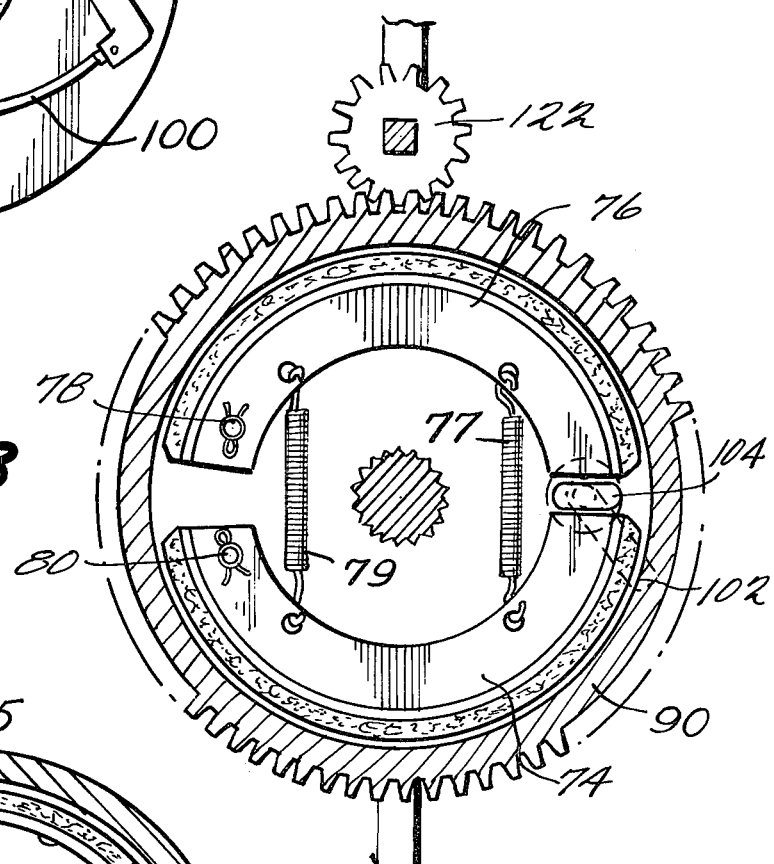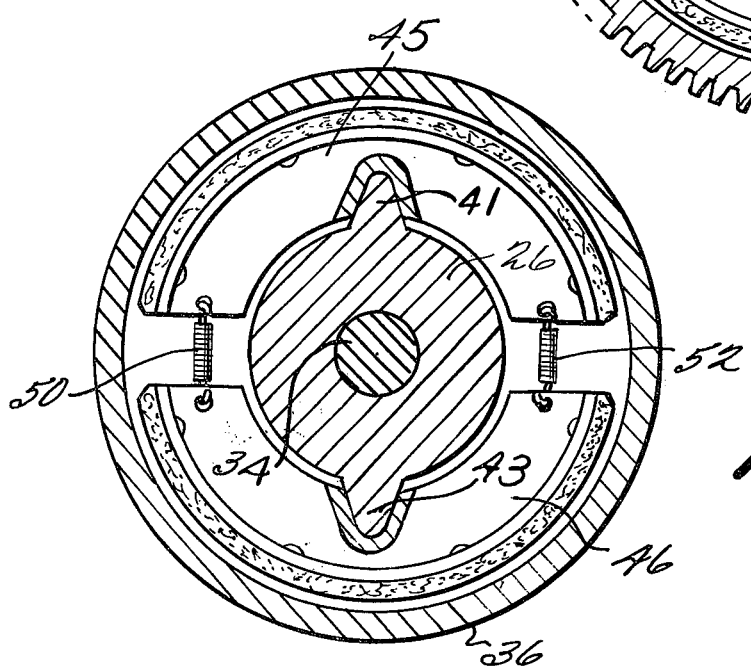

TRIPLE ACTION MECHANICAL CHUTE-HOIST

BRIEF DESCRIPTION OF THE PRIOR ART AND SUMMARY OF THE INVENTION

The invention relates to an apparatus for permitting an individual or any other type of load to safely ascend or descend a cable.

There are many circumstances in which an individual or a load must safely descend from a height too great to simply drop but not high enough to use a parachute. A helicopter can now be used to hover over any given spot on which an individual wishes to land or a load to hit. Often it is not possible or safe for the helicopter itself to set down on the location. In military applications, the site may be occupied by a hostile force or subject to enemy fire or the trees too tall or close together. In civilian applications, the site may be littered with trees or the like, or the ground may not be considered firm enough to hold the helicopter.

One way in the past which has been utilized for descending from a hovering helicopter or a high building or the like, has been to tie one end of a rope at the jump location and simply to slide along the rope using hands and feet to brake the descent. This technique requires considerable skill and is inherently dangerous.

The present invention relates to an apparatus with which an individual can descend a cable or rope at a safe, controlled speed, which may be adjusted to any desired speed. As discussed in detail below, the invention includes a reel about which a rope is wound and which is mounted on a frame for rotation to pay out or wind cable. The frame in turn is adapted to be strapped to the back or chest of an individual using the apparatus or hold a load. A centrifugal brake engages a portion of the rotating reel to maintain a controlled, safe rate of descent. Further, a second mechanically operated brake drum can be manually activated by a hand operated grip to stop descent at any given position. A hand operated crank, which may if desired be replaced by a motor, engages teeth on the exterior of the reel to permit the individual to ascend the cable by operation of the crank to rewind the cable on the reel and ascend.

Many other objects and purposes of the invention will become clear from the following description of the drawings.

BRIEF DESCRIPTION OF THE DRAWINGS

FIG. 1 shows a sectional view of one embodiment of the apparatus of this invention.

FIG. 2 shows a cut-away sectional view of the embodiment of FIG. 1 along the lines 2—2.

FIG. 3 shows a further sectional view of the embodiment of FIG. 1 along the lines 3—3.

FIG. 4 shows an end view of the embodiment of FIG. 1.

FIG. 5 shows a view of an individual wearing the apparatus of this invention descending a cable.

FIG. 6 shows a view of an individual wearing the apparatus of this invention ascending a cable.

DETAILED DESCRIPTION OF THE DRAWINGS

Reference is now made to FIGS. 1 through 4 which illustrate one embodiment of the unique invention of this application. As indicated above, this apparatus is designed to be strapped to either the chest or back of an individual and to permit that individual to descend or ascend a cable 20 which is attached at its upper end to a helicopter, a building roof or the like. Frame member 22 may be attached by any suitable straps or the like to the chest or back or to a suitable load.

Cable 20 is initially wound about the center portion 24 of a reel member 26. During descent, reel 26 rotates, paying out rope or cable 20 through hole 28 of frame member 22. Reel 26 is mounted between bearing members 30 and 32 for rotation about a fixed center shaft 34. Shaft 34 is in turn fixedly attached by stipples on shaft 34 to circular drum member 36. Drum member 36 is in turn attached to frame member 22 by bolts 38 and 40. Threaded portion 42 of shaft 34 engages nut 44 for preventing lateral movement of shaft 34.

As can be best seen in FIG. 2, reel 26 is provided on its periphery with outwardly extending portions 41 and 43 which engage corresponding portions of a pair of brake shoes 45 and 46. Brake shoes 45 and 46 are in turn provided on their periphery with conventional material of the type used in automobile and other brakes. As reel 26 is rotated by the paying out of cable 20, rotating shoes 45 and 46 with it, shoes 45 and 46 move outward against the force exerted by springs 50 and 52 under the influence of centrifugal force to engage the inner surface of brake drum 36, creating friction which limits the speed of descent of the individual or load who is or which is strapped to the apparatus. Alternately, the springs could urge shoes 45 and 46 against brake drum 36. The faster the rate of descent, the faster the speed of rotation of reel 26 and, accordingly, the greater the force which is exerted by shoes 45 and 46. The speed of descent can thus be chosen by varying the diameter of portion 24 of reel 26 and/or varying the cable diameter to vary the speed of rotation of the reel 26 and accordingly the centrifugal force thus generated.

A second brake mechanism is also provided for permitting the individual ascending or descending cable 20 to stop at any given location, for example, to clear away litter preventing a landing or to enter a building through a window, etc. For that purpose, end plate 60 is attached to shaft 34 by the stippled portion 62 at the end opposite nut 44. The portion 64 of shaft 34, which is adjacent stippled portion 62, is also threaded and engages a nut 66 which also prevents lateral movement of the fixed shaft 34. End plate 60, as can be seen in FIG. 4, is fixedly attached to frame member 22 by bolts 70 and 72. As shown in FIG. 4, frame member 22 is broken into two pieces which are bolted or otherwise held together after assembly. As can be seen in FIG. 3, a further pair of conventional brake shoes 74 and 76 are pivotably mounted about pins 78 and 80 which attach shoes 74 and 76 to end plate 60. Shoes 74 and 76 are continually pulled inwardly away from the inner periphery of portion 90 of spinning reel member 26 by springs 77 and 79. The second brake mechanism can also be operated by remote control.

As shown in FIG. 1, a hand grip 96 includes a manually operable lever 98 which engages a bowden wire 100 which in turn is attached to a lever 102 mounted on end plate 60. Lever 102 includes an actuating arm 104 which extends between the ends of brake shoes 74 and 76 remote from their pivots about pins 78 and 80. Manual operation of lever 98 pivots member 104 from its illustrated position, urging shoes 74 and 76 into contact with the inner periphery of the portion 90 of rotating reel 26, forcing the reel 26 to cease rotating and descent and/or ascent to halt.

The third possible operation of the embodiment illustrated in the drawings of this application is ascent of cable 20 by means of manually operable crank 120. Crank 120 includes a shaft portion 122 which extends through an aperture in frame 22 and about which a gear 124 is fixedly attached by a pin 126. Since gear 124 is larger than the aperture in frame member 22 through which shaft 122 extends, crank 120 is thus held in position between gear 124 and nut 130 on a threaded portion of gear 124. As can be best seen in FIG. 3, gear 124 has a plurality of teeth extending about its periphery which engage corresponding teeth on the outer periphery of portion 90 of reel 26.

FIGS. 5 and 6 show schematically the way in which the apparatus of this invention can be easily used by an individual, mounting the apparatus either on chest or back, to ascend or descend a cable from a building, helicopter or the like.

Many changes and modifications in the above described embodiment of the invention can of course be carried out without departing from the scope of the invention. Accordingly, that scope is intended to be limited only by the scope of the appended claims.

What is claimed is:

1. Apparatus for descending and ascending a cable comprising:
 a reel member having a central portion disposed about a rotation axis and onto which said cable can be wound, an integral first end portion forming a braking surface extending cylindrically about said rotation axis from said central portion, and an opposite end portion adapted for cooperating with centrifugal brake means disposed about said rotation axis and extending oppositely from said central portion,
 a stationary frame,
 means for mounting said reel member in said frame for rotation to pay out or wind said cable,
 centrifugal brake means including a stationary frame portion opposing said end portion and brake shoe means carried by said opposite end portion of said reel member for rotation therewith to engage said stationary opposing frame portion and brake said reel member during rotation thereof, the braking force being a function of the speed of rotation,
 actuable brake means mounted on said frame for engaging said braking surface of said first end portion of said reel means to retard or stop rotation of said reel member,
 manual control means coupled to said actuable brake means for operating said actuable brake means to stop rotation of said reel member, and
 ascend means engaging the reel member to rotate the reel member and wind said cable onto said reel member to ascend said cable.

2. Apparatus as in claim 1 wherein said reel member has a portion with teeth extending circumferentially about said reel member and said ascend means comprises a gear member engaging said teeth, a crank arm fixedly attached to said gear member for rotating said gear to wind cable on said reel member and means mounting said crank arm in said frame for rotation.

3. Apparatus as in claim 1 wherein said actuable brake means is manually operable and includes a pair of brake shoes, means pivotably mounting said brake shoes, spring means urging said brake shoes out of engagement with adjacent surfaces of said reel member, an actuating member having a rest position and an actuating position in which said actuating member engages said brake shoes against the urging of said spring means to force said brake shoes against said adjacent surfaces of said reel member to brake said reel member and wherein said manual control means includes a grip member and a wire connected between said grip member and said actuating member.

4. Apparatus as in claim 3 wherein said centrifugal brake means includes a pair of centrifugal brake shoes mounted on said opposite end portion of said reel member for rotation therewith, and spring means urging said centrifugal brake shoes out of engagement with said frame portion.

5. Apparatus as in claim 1 further including said cable.

6. Apparatus as in claim 1 wherein said further brake means comprising said centrifugal brake means.

7. Apparatus for descending a cable comprising:
 a reel member having a central portion disposed about a rotation axis and onto which said cable can be wound, an integral first end portion extending from said central portion and forming a braking surface extending cylindrically about said rotation axis, and an opposite end portion extending oppositely from said central portion adapted for cooperating with centrifugal brake means disposed about said rotation axis,
 a stationary frame
 means for mounting said reel member in said frame for rotation to pay out or wind said cable,
 centrifugal rotating brake means including a stationary frame portion opposing said opposite end portion and brake shoe means carried by said opposite end portion of said reel member for rotation therewith to engage an opposite stationary frame portion during rotation thereof and brake said reel member, the braking force being a function of the speed of rotation,
 manually actuable brake means for engaging said braking surface of said first end portion of said reel means to retard or stop rotation of said reel member, including a brake shoe member, means pivotably mounting said shoe member adjacent said braking surface, means urging said brake shoe member out of engagement with said braking surface, and actuating means engaging said brake shoe member and rotatable to pivot said shoe member into braking relation with said braking surface, and
 manual control means coupled to said actuable brake means for rotating said actuating means to retard and stop rotation of said reel member.

* * * * *